United States Patent Office 3,849,462
Patented Nov. 19, 1974

3,849,462
ROOM TEMPERATURE CURABLE
ORGANOPOLYSILOXANES
Guenther Fritz Lengnick, Adrian, Mich., assignor to
Stauffer Chemical Company, Westport, Conn.
No Drawing. Application June 8, 1973, Ser. No. 368,427,
which is a continuation-in-part of abandoned application Ser. No. 270,368, July 10, 1972. Divided and this
application Feb. 8, 1974, Ser. No. 440,927
Int. Cl. C07f 7/08, 7/10
U.S. Cl. 260—448.2 D
3 Claims

ABSTRACT OF THE DISCLOSURE

The invention relates to novel cross-linking agents and to curable one-component organopolysiloxanes obtained from the reaction of a hydroxyl-terminated organopolysiloxane and the novel disilane cross-linking agents having functional groups which are hydrolyzable in ambient moisture.

---

This is a division of application Ser. No. 368,427, filed June 8, 1973.

Application 368,427 is a continuation-in-part of applicant's copending application Ser. No. 270,368, filed July 10, 1972, now abandoned.

This invention relates to curable one-component organopolysiloxanes, particularly organopolysiloxanes which are activated in the presence moisture and more particularly to curable organopolysiloxanes which are obtained from the reaction of disilane cross-linking agents having groups which are hydrolyzable in ambient moisture and hydroxyl-terminated organopolysiloxanes.

Heretofore, it was known that certain fluid organopolysiloxanes, when exposed to atmospheric moisture at room-temperature are converted to an elastomeric state. The desirability of a room-temperature curing system is well known; however, the conventional room-temperature curing system involves two or more stable components which when mixed together, rapidly cure to a solid state. In other words, the end-user was provided with a two-package system in which one-component was added just prior to use. Although the two-package system is adequate for many applications, there are other applications where the two-package system is undesirable because of lack of skilled workmen or because the equipment is inadequate to carry out the necessary mixing operation.

In addition to the two-package system, the silicone industry has also been provided with single-package room-temperature curable organopolysiloxane compositions which contain various hydrolyzable groups. However, these curable single-package compositions have been extremely difficult to adapt to circumstances where extended working times are necessary or desirable. Also, in some commercial applications, it is desirable to provide organopolysiloxane compositions which will cure to an elastomer that is resistant to compression, has greater solvent resistance, has improved cross-linking and improved hardness. Heretofore, none of the organopolysiloxanes commercially available provide all of these desirable properties.

It is therefore an object of this invention to provide an organopolysiloxane which is curable at room-temperature. Another object of this invention is to provide compositions which have varying working times without reducing the cross-linking ability of the polymers employed. Still another object of this invention is to provide elastomeric materials which have improved physical properties. A further object of this invention is to provide novel cross-linking agents which will react with hydroxyl-terminated organopolysiloxanes to form elastomeric materials having improved properties. A still further object of this invention is to provide organopolysiloxane compositions which may be dispensed in a single-package.

The foregoing objects and others which will become apparent from the following description, are accomplished in accordance with this invention, generally speaking, by providing curable organopolysiloxane compositions of the general formula:

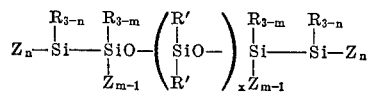

wherein R and R' which may be the same or different represent monovalent hydrocarbon radicals, halogenated monovalent hydrocarbon radicals or cyanoalkyl radicals; Z which is a radical hydrolyzable by atmospheric moisture is selected from the group consisting of aminooxy, amino, oximo, amido and phosphato radicals; $m$ is a number of from 1 to 3, $n$ is a number of from 0 to 3 and the sum of $m$ and $n$ is greater than 2; $x$ is a number of from 1 to 20,000.

The organopolysiloxane compositions of this invention are prepared by mixing disilanes of the general formula:

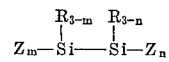

with an organopolysiloxane of the formula:

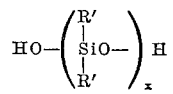

in which R, R', Z, $m$, $n$ and $x$ are the same as those represented above. Organic radicals represented by R and R' are alkyl radicals having from 1 to 18 carbon atoms such as methyl, ethyl, propyl, butyl, hexyl, octyl, decyl, dodecyl, tetradecyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluoropenyl and the like; alkenyl radicals such as vinyl, allyl and the like and cyanoalkyl radicals having up to 4 carbon atoms in the alkyl groups. Examples of hydrolyzable groups are aminooxy groups

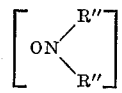

such as dimethylaminooxy, diethylaminooxy, dipropylaminooxy, dibutylaminooxy, methylphenylaminooxy and the like. Suitable oximo groups

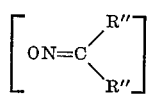

are acetophenoximo, acetoximo, benzophenoximo, 2-butanoximo, diisopropylketonoximo, chlorocyclohexanoximo, alpha-bromoacetaphenoximo and the like. Examples of suitable phosphato groups

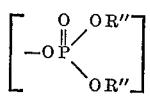

are dimethylphosphato, diethylphosphato, dipropylphosphato, dibutylphosphato, dihexylphosphato, dioctylphosphato, didodecylphosphato, dioctadecylphosphato, methylethylphosphato, ethylpropylphosphato, methyloctadecylphosphato, ethyltetradecylphosphato, diphenylphosphato, methylphenylphosphato, butylphenylphosphato and the like. Amino radicals

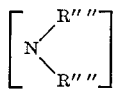

having up to 10 carbon atoms which may be employed in this invention are N,N-dimethylamino, N,N-dibutylamino, N,N-dihexylamino, N-methyl - N - ethylamino, N-methylamine, N-ethylamino, N-hexylamino, N-phenylamino and the like. Examples of suitable amido radicals are acetamido, propionamido, acrylamido, caproamido, pentadecaamido, dodecanediamido, malonamido, phthalamido, naphthalamido, 2-naphthamido and the like.

The radicals represented by R'' and R''' which may be the same or different, are monovalent hydrocarbon radicals or halogenated monovalent hydrocarbon radicals and the radicals represented by R'''' may be the same as R''' or hydrogen.

The cross-linking agents of this invention, may be prepared by reacting halogenated organodisilanes with an organic compound having the appropriate functional groups to form compounds having groups which are hydrolyzable at ambient moisture. For example, 1,1,1,2-tetrachloro-2,2-dimethyldisilane may be reacted with an organic hydroxylamine, e.g., diethylhydroxylamine in accordance with the following equation:

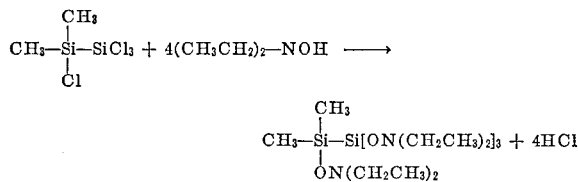

Instead of the hydroxylamine, the halo-organodisilanes may be reacted with oximes, amides or phosphate compounds to form compounds having the corresponding functional groups which are hydrolyzable in ambient mois- EA functional groups which are hydrolyzable in ambient moisture.

Generally, these halogen containing organodisilanes are reacted with organic compounds containing the appropriate functional groups at a temperature of from about room-temperature to about 150° C., preferably from about 40° C. to about 120° C. in the presence of a solvent which is inert to the reactants and the reaction product. Suitable solvents include aliphatic hydrocarbons such as pentane, hexane, heptane, octane; aromatic hydrocarbons such as benzene, toluene, xylene, naphthenes, as well as halogenated solvents such as methylene chloride, chlorobenzene and the like. Other solvents which may be used are organic ethers such as petroleum ether, diethyl ether, dibutyl ether and hydroxy-free fluid siloxanes.

Disilanes having phosphate functional groups may be prepared by reacting halogen containing disilanes with an alkali metal or alkaline earth metal salt in the presence of one of the inert organic solvents described above.

The conventional organopolysiloxanes described heretofore may be prepared from difunctional organosilanes of the formula:

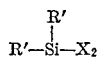

wherein the R'(s) which may be the same or different represent halogenated or unhalogenated monovalent aliphatic, alicyclic or aromatic hydrocarbon radicals such as methyl, ethyl, vinyl, allyl, cyclohexyl, cyclohexenyl, phenyl, tolyl and cyanoalkyl radicals and X represents a hydrolyzable atom or group such as halogen atoms or alkoxy groups. The diorganopolysiloxanes may be homopolymers as well as copolymers, that is, compounds derived from two or more different diorganosilanes and even the organic radicals linked to any particular silicon atom may be different organic radicals. Especially useful are the dimethylpolysiloxanes, methylphenylpolysiloxanes and the methylvinylpolysiloxanes.

The compositions of this invention may be prepared by mixing the disilanes which contain hydrolyzable functional groups with hydroxyl-terminated organopolysiloxanes at any convenient temperature and thereafter exposing the composition to atmospheric moisture. Although in general, temperatures ranging from about 20° C. to 100° C. are sufficient, it should be understood, of course, that higher or lower temperatures may be employed if desired, although preferably, the reaction should be carried out at temperatures below about 200° C. If desired, the reaction may be carried out in the presence of an inert solvent which is unreactive with both the terminal-hydroxyl groups on the organopolysiloxane or the functional groups on the disilanes. Solvents which may be used include hydrocarbons such as benzene, toluene, xylene, halogenated solvents such as ethylene chloride, perchloroethylene, chlorobenzene and the like; organic ethers such as diethyl ether, dibutyl ether or hydroxyl-free fluid siloxanes. The presence of solvents are particularly desirable when the hydroxyl-terminated organopolysiloxane has a high viscosity. In these cases, the solvent reduces the over-all viscosity of the mixture and facilitates the reaction.

The ratio of disilane cross-linking agent to organopolysiloxane is not critical. However, it is preferred that at least one mole of the disilane cross-linking agent be used per mole of silicon-bonded hydroxyl group and more preferably from about two to five moles of the disilane be used per mole of silicon-bonded hydroxyl group on the organopolysiloxane. It is possible to use up to about 12 moles of the disilane per mole of silicon-bonded hydroxyl group since a large excess of the disilane insures complete reaction with all of the silicon-bonded hydroxyl groups. It is preferred that the reaction be carried out in the absence of moisture since the latter may interfere with the reaction. However, traces of moisture are not especially harmful if an excess of the disilane cross-linking agent is employed.

The compositions of this invention may consist solely of the reaction product of an organopolysiloxane and a disilane cross-linking agent containing hydrolyzable groups. However, for modifying the consistency of the uncured composition or to reinforce the cured product or for some other purpose, mineral fillers in the form of very fine powders may be added.

Examples of mineral fillers which may be used are various kinds of silicas, oxides of iron, zinc, camium, aluminum and carbonates. The proportion and type of filler employed will depend to a certain extent on the use of which the composition is to be applied. Silica obtained by precipitation, for example, those sold under the trade names Santo-Sil and Hi-Sil and silicas obtained from combustion such as sold under the trade name Aero-Sil are particularly suitable for the production of reinforced elastomeric products. These micro-fine silicas have a large absorptive surface and are effective even in small quantities. Fillers such as milled natural silicas and calcium carbonate can, on the other hand, be employed in large proportions, for example, 200 percent based on the weight of the organopolysiloxane.

In addition to the fillers mentioned heretofore, compositions conforming to the invention may contain coloring agents, thixotropic agents, agents capable of preventing the passage of ultraviolet light disiccants and antioxidants.

In addition to the constituents mentioned above, the compositions may contain for the purpose of accelerating the curing rate certain compounds which have a catalytic effect on the condensation reactions. Although several compounds are known to have a catalytic effect on the curing rate, organotin compounds are preferred. Examples of suitable catalysts are the tin salts of organic acids such as tin naphthenate, tin 2-ethylhexoate, tin benzoate, dibutyl-tin dilaurate, dibutyltin diacetate, bis-(dibutyltin oleate)oxide, bis-(dibutyltin stearate)oxide, dibutyltin oleate hydroxide and the like. The catalysts may be used in an amount of from about 0.001 to about 1 percent, preferably from about 0.2 to about 0.5 percent based on the weight of the organopolysiloxane.

Curable compositions may be prepared by mixing a liquid hydroxyl-terminated organopolysiloxane and a filler in any conventional mixing apparatus such as a Sigma blade mixer, roller mill, Banbury Mixer and the like and thereafter heating the mixture for a sufficient time to eliminate all traces of moisture. The mass is cooled and the disilane cross-linking agent containing hydrolyzable groups is added and, if desired, a catalyst and an anhydrous organic diluent. The composition may be used immediately or it may be transferred under anhydrous conditions to dry containers which are hermatically sealed. The products thus prepared may be kept for several months and even years.

The compositions may be cured by merely exposing them to atmospheric moisture with or without any additional water vapor. Upon exposure to moisture, the compositions cure in a few minutes up to several hours or days depending upon the type of groups present on the cross-linking agent. In general, an increase in molecular weight of any of the groups will increase the time of cure.

The products of this invention adhere to a variety of materials such as wood, metal, glass, ceramics, plastics and the like. In the case of metals, it may be desirable to pretreat the metal before applying the compositions of this invention. These self-curing compositions may serve as caulking materials, as coatings for various articles such as electrical equipment, glass, metals and fabrics. They may be applied as a coating by any of the usual techniques such as by dipping, doctoring or spraying.

Various aspects of the invention are further illustrated by the following examples which are not to be taken as in any way limiting the scope thereof. In the examples, all parts are by weight unless otherwise specified.

Example 1

Approximately 630 parts of N,N-diethylhydroxylamine dissolved in about 170 parts of dry heptane are added to a reactor containing about 183 parts of 1,1,1,2-tetrachloro-2,2-dimethyldisilane in about 250 parts of dry heptane and heated to reflux temperature for about 1 hour. A precipitate is formed which is removed by filtration and identified as N,N-diethylhydroxylamine hydrochloride. The heptane solvents and excess N,N-diethylhydroxylamine are removed in vacuo yielding a residual product which is identified as 1,1,1,2-tetrakis-(diethylaminooxy)-2,2-dimethyldisilane.

About 4 parts of the disilane prepared above is added to about 20 parts of a hydroxy-terminated dimethylpolysiloxane which is substantially free of moisture and heated to 80° C. for about 1 hour with agitation. The volatile materials are removed under vacuum and the residual product transferred to a mold and cured at atmospheric moisture. The material cured to a tack-free condition in about 0.2 hour.

Example 2

In accordance with the procedure described in Example 1, about 1,600 parts of N,N-dioctylhydroxylamine dissolved in about 400 parts of dry heptane are added to a reactor containing about 183 parts of 1,1,1,2-tetrachloro-2,2-dimethyldisilane in about 230 parts of dry heptane and heated to reflux temperature for about 1 hour. A precipitate which is identified as N,N-dioctylhydroxylamine hydrochloride is formed which is removed by filtration and the heptane solvent and excess N,N-dioctylhydroxylamine are removed in vacuo yielding a residual product identified as 1,1,1,2-tetrakis-(dioctylaminooxy)-2,2-dimethyldisilane.

The product prepared above is added to a hydroxyl-terminated dimethylpolysiloxane (2000 cs. at 25° C.) and heated to 80° C. in accordance with the procedure described in Example 1. The residual product is transferred to a mold and cured at atmospheric moisture. A tack-free product is formed in about 1.4 hours.

Example 3

In accordance with the procedure described in Example 1, 930 parts of N,N-diethylhydroxylamine in about 250 parts of dry heptane are added to a reactor containing about 200 parts of 1,1,1,2,2,2-hexachlorodisilane in about 250 parts of dry heptane and heated to reflux temperature for about 1 hour. A residual product is recovered which is identified as 1,1,1,2,2,2 - hexakis - (diethylaminooxy) disilane.

The disilane prepared above is added to a hydroxyl-terminated dimethylpolysiloxane and heated to 80° C. in accordance with the procedure described in Example 1. The residual product is transferred to a mold and cured at atmospheric moisture. A tack-free product is formed in about 0.3 hour.

Example 4

About 250 parts of acetoxime dissolved in about 357 parts of ethyl ether are added dropwise with stirring to a reactor containing a solution of 183 parts of 1,1,1,2-tetrachloro-2,2-dimethyldisilane dissolved in about 600 parts of toluene and about 90 parts of pyridine. As the exothermic reaction progresses, small increments of toluene are added to dilute the large volume of pyridine hydrochloride formed. After the reaction is complete, the reaction mass is cooled to room-temperature and the product mixture filtered and stripped of toluene and excess pyridine. A residual product is recovered which is identified as:

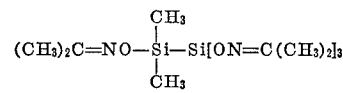

The disilane prepared above is added to a hydroxyl-terminated dimethylpolysiloxane (2000 cs. at 25° C.) and heated to about 80° C. in accordance with the procedure described in Example 1. The residual product is transferred to a mold and cured at ambient moisture. A tack-free product is formed in about 0.2 hour.

Example 5

In accordance with the procedure described in Example 4, about 670 parts of benzophenonoxime dissolved in about 600 parts of ethyl ether is added dropwise with stirring to a solution containing 183 parts of 1,1,1,2-tetrachloro-2,2-dimethyldisilane, about 600 parts of toluene and about 320 parts of pyridine. A residual product is recovered which is identified as:

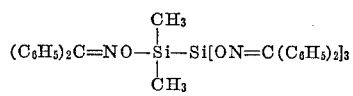

The disilane prepared above is added to a hydroxyl-terminated dimethylpolysiloxane (2000 cs. at 25° C.) and heated to 80° C. in accordance with the procedure in Example 1. The residual product cures to a tack-free condition in about 1.3 hours.

Example 6

In accordance with the procedure described in Example 4, about 450 parts of butyraldehyde oxime in about 600 parts of ethyl ether is added dorpwise with stirring to a solution containing 200 parts of 1,1,1,2,2,2-hexachlorodisilane, about 1,000 parts of toluene and about 480 parts of pyridine. A reaction product is recovered which is identified as:

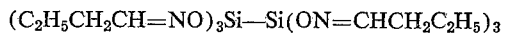

by chemical analysis.

The disilane prepared above is added to a hydroxyl-terminated dimethylpolysiloxane and heated to 80° C. in accordance with the procedure described in Example 1.

The material cured to a tack-free condition in about 1.1 hours.

Example 7

Approximately 520 parts of diethyl hydrogen phosphate are added to about 500 parts of benzene and introduced into a reactor containing 183 parts of 1,1,1,2-tetrachloro-2,2-dimethyldisilane in about 500 parts of benzene. The reactants are heated to reflux temperature for about 1 hour with agitation and nitrogen is then passed through the solution for approximately 4 hours. The solvent and volatile materials are distilled off at reduced pressure. A residual product is recovered which is identified as 1,1,1,2-tetrakis-(diethylphosphato)-2,2-dimethyldisilane.

The disilane prepared above is added to a hydroxyl-terminated dimethylpolysiloxane and heated to 80° C. in accordance with the procedure described in Example 1. The residual product is transferred to a mold at ambient moisture. A tack-free product is formed in about 0.4 hour.

Example 8

In accordance with the procedure described in Example 7, approximately 650 parts of dimethyl hydrogen phosphate in about 600 parts of benzene are introduced into a reactor containing about 200 parts of 1,1,1,2,2,2-hexachlorodisilane in about 600 parts of benzene and heated to reflux for about 1 hour. After the volatile materials and solvent are removed, a residual product is recovered which is identified as 1,1,1,2,2,2-hexakis-(dimethylphosphato)disilane.

The phosphatodisilane prepared above is added to a hydroxyl-terminated dimethylpolysiloxane and heated to 80° C. in accordance with the procedure described in Example 1. The product cures at ambient moisture to form a tack-free material in about 0.2 hour.

Example 9

In accordance with the procedure described in Example 7, about 850 parts of diphenyl hydrogen phosphate in about 800 parts of benzene are introduced into a reactor containing about 172 parts of 1,1,2,2-tetrachloro-1,2-dimethyldisilane dissolved in about 300 parts of benzene and heated to reflux temperature for about 2 hours with agitation. After the volatile materials and excess solvent are removed under vacuum distillation, a residual product is recovered which is identified as 1,1,2,2-tetrakis-(diphenylphosphato)-1,2-dimethyldisilane.

The phosphatodisilane prepared above is added to a hydroxyl-terminated dimethylpolysiloxane in accordance with the procedure described in Example 1. A residual product is recovered which cures to a tack-free condition in ambient moisture in about 1.4 hours.

Example 10

Approximately 250 parts of acetamide in about 300 parts of chloroform are added to a reactor containing about 228 parts of 1,1,1,2-tetrachloro-2,2-dimethyldisilane, about 250 parts of chloroform and about 140 parts of pyridine and heated to reflux temperature for about 1 hour. The reaction mass is cooled to room-temperature and filtered and stripped of solvent. A residual product is recovered which is identified as:

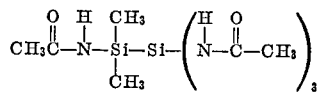

The disilane prepared above is added to a hydroxyl-terminated dimethylpolysiloxane (2000 cs. at 25° C.) and heated to about 80° C. in accordance with the procedure described in Example 1. The residual product is transferred to a mold and cured at atmospheric moisture. A tack-free composition is formed in about 0.5 hour.

Example 11

Approximately 300 parts of butylamine in about 300 parts of benzene are added to a reactor containing about 228 parts of 1,1,1,2-tetrachloro - 2,2 - dimethyldisilane, about 250 parts of chloroform and about 140 parts of pyridine and are heated to reflux temperature for about 1 hour. The reaction mass is cooled to room-temperature and filtered and stripped of benzene. A residual product is recovered which is identified as:

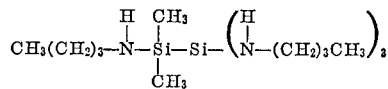

The disilane prepared above is added to a hydroxyl-terminated dimethylpolysiloxane (2000 cs. at 25° C.) and heated to about 80° C. in accordance with the procedure described in Example 1. The residual product is transferred to a mold and cured at atmospheric moisture. A tack-free composition is formed in about 0.3 hour.

Example 12

Approximately 440 parts of benzylamine in about 400 parts of chloroform are added to a reactor containing about 228 parts of 1,1,1,2-tetrachloro-2,2-dimethyldisilane, about 250 parts of chloroform and about 140 parts of pyridine and heated to reflux temperature and filtered and stripped of solvent. A residual product is recovered which is identified as:

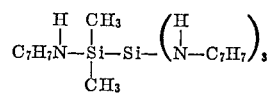

The disilane prepared above is added to a hydroxyl-terminated dimethylpolysiloxane (2000 cs. at 25° C.) and heated to about 80° C. in accordance with the procedure described in Example 1. The residual product is transferred to a mold and cured at atmospheric moisture. A tack-free composition is formed in about 0.4 hour.

When the above examples are repeated utilizing other disilanes with hydroxyl-terminated organopolysiloxanes, elastomeric materials are obtained which have properties similar to those of the specified examples.

Although specific examples of the invention have been described herein, other variations and modifications falling within the spirit and scope of the appended claims are to be included therein.

The invention claimed is:

1. A compound of the formula:

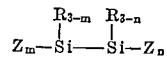

wherein R is selected from the group consisting of monovalent hydrocarbon radicals, halogenated monovalent hydrocarbon radicals and cyanoalkyl radicals; Z is a hydrolyzable group selected from the class consisting of aminooxy radicals, amino radicals, oximo radicals, amido radicals and phosphato radicals; $m$ is a number of from 1 to 3, $n$ is a number of from 0 to 3 and the sum of $m$ and $n$ is greater than 2.

2. The compound of Claim 1 wherein Z is a phosphato radical.

3. The compound of Claim 1 wherein Z is an oximo radical.

References Cited

UNITED STATES PATENTS

| | | | |
|---|---|---|---|
| 3,717,665 | 2/1973 | Stuart | 260—448.2 D |
| 3,189,576 | 6/1965 | Sweet | 260—448.2 N X |
| 3,441,583 | 4/1969 | Murphy | 260—448.2 N |
| 3,453,303 | 7/1969 | Selin | 260—448.2 D |

DANIEL E. WYMAN, Primary Examiner

P. F. SHAVER, Assistant Examiner

U.S. Cl. X.R.

117—124 F, 135.1, 140 R, 140 A; 260—37 SB, 37 N, 46.5 G, 46.5 P, 448.2 N